(12) United States Patent
Lunday et al.

(10) Patent No.: US 12,704,155 B2
(45) **Date of Patent: *Aug. 11, 2026**

(54) TORQUE-LIMITING SPINDLE

(71) Applicant: Schlage Lock Company LLC, Carmel, IN (US)

(72) Inventors: Drake Lunday, Colorado Springs, CO (US); Adam M. Litwinski, Centennial, CO (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/006,421

(22) Filed: Dec. 31, 2024

(65) Prior Publication Data

US 2025/0334152 A1 Oct. 30, 2025

Related U.S. Application Data

(60) Continuation of application No. 18/378,427, filed on Oct. 10, 2023, now Pat. No. 12,181,011, which is a division of application No. 17/028,136, filed on Sep. 22, 2020, now Pat. No. 11,781,600.

(51) Int. Cl.

| | |
|---|---|
| ***E05B 15/00*** | (2006.01) |
| ***F16D 7/02*** | (2006.01) |
| ***F16D 7/04*** | (2006.01) |
| *E05B 17/00* | (2006.01) |

(52) U.S. Cl.

CPC .......... *F16D 7/044* (2013.01); *E05B 15/0033* (2013.01); *F16D 7/021* (2013.01); *Y10T 292/93* (2015.04)

(58) Field of Classification Search

None

See application file for complete search history.

(56) References Cited

U.S. PATENT DOCUMENTS

| | | | | |
|---|---|---|---|---|
| 1,090,772 A * | 3/1914 | Netschert | ............. | E05B 55/005 292/358 |
| 1,565,754 A | 12/1925 | Orth | | |
| 1,634,845 A | 7/1927 | Netschert | | |

(Continued)

FOREIGN PATENT DOCUMENTS

| | | |
|---|---|---|
| AU | 2016201008 A1 | 10/2016 |
| DE | 102011000755 A1 | 8/2012 |

(Continued)

*Primary Examiner* — Carlos Lugo

(74) *Attorney, Agent, or Firm* — Taft Stettinius & Hollister LLP

(57) ABSTRACT

An exemplary torque-limiting spindle includes an input member, an output member, a clutch mechanism, and a bias mechanism. The input member extends along a longitudinal axis, is configured for connection with a handle, and includes a first engagement feature. The output member extends along the longitudinal axis, is configured for connection with a rotatable member of a lockset, and includes a second engagement feature. The clutch mechanism includes the first engagement feature and the second engagement feature. The bias mechanism is engaged with the input member and the output member and exerts a biasing force urging the first engagement feature and the second engagement feature into engagement with one another.

23 Claims, 7 Drawing Sheets

(56) References Cited

U.S. PATENT DOCUMENTS

| | | | | |
|---|---|---|---|---|
| 1,783,785 | A * | 12/1930 | Habicht | E05C 1/163 292/359 |
| 5,219,192 | A | 6/1993 | Berger | |
| 5,520,427 | A | 5/1996 | Mader | |
| 5,730,014 | A | 3/1998 | Berger et al. | |
| 5,787,743 | A | 8/1998 | Weigard | |
| 5,787,744 | A | 8/1998 | Berger et al. | |
| 6,527,314 | B2 | 3/2003 | Brown | |
| 6,615,630 | B2 | 9/2003 | Wu et al. | |
| 6,622,534 | B1 | 9/2003 | Miller et al. | |
| 6,869,116 | B2 | 3/2005 | Dalsing | |
| 7,007,524 | B2 | 3/2006 | Jasper | |
| 7,377,140 | B2 | 5/2008 | Shen et al. | |
| 7,523,971 | B2 * | 4/2009 | Ebert | E05B 3/04 292/358 |
| 8,720,960 | B2 | 5/2014 | Nadgouda et al. | |
| 10,202,784 | B2 | 2/2019 | Parker et al. | |
| 10,260,253 | B2 | 4/2019 | Moon | |
| 10,260,254 | B2 | 4/2019 | Cohen et al. | |
| 11,781,600 | B2 | 10/2023 | Lunday et al. | |
| 2009/0025438 | A1 | 1/2009 | Don et al. | |
| 2011/0248518 | A1 | 10/2011 | Tien | |
| 2019/0234107 | A1 | 8/2019 | Zlavdinov | |
| 2020/0248476 | A1 | 8/2020 | Verderaime et al. | |

FOREIGN PATENT DOCUMENTS

| | | | |
|---|---|---|---|
| EP | 1524389 | A1 | 4/2005 |
| EP | 2431557 | B1 | 3/2016 |
| EP | 3156564 | A1 | 4/2017 |
| EP | 3382129 | B1 | 7/2019 |
| GB | 655528 | A | 7/1951 |
| WO | 2005111347 | A1 | 11/2005 |
| WO | 2012083315 | A2 | 6/2012 |
| WO | 2017211223 | A1 | 12/2017 |

* cited by examiner

TORQUE-LIMITING SPINDLE

CROSS REFERENCE TO RELATED APPLICATIONS

The present application is a continuation of U.S. patent application Ser. No. 18/378,427 filed Oct. 10, 2023 and issued as U.S. Pat. No. 12,181,011, which is a divisional of U.S. patent application Ser. No. 17/028,136 filed Sep. 22, 2020 and issued as U.S. Pat. No. 11,781,600, the contents of each application are hereby incorporated by reference in their entirety.

TECHNICAL FIELD

The present disclosure generally relates to locksets, and more particularly but not exclusively relates to systems and methods for limiting a torque input to a lockset.

BACKGROUND

Certain locksets include a handle that is operable to retract a bolt when the lockset is in an unlocked condition, and which cannot retract the bolt when the lockset is in a locked condition. In such locksets, it is common to lock the handle in position when the lockset is in the locked condition, thereby preventing the handle from retracting the bolt. However, such locksets can be susceptible to an over-torqueing attack, in which an excessive torque is applied to the handle. Such excessive torques can damage the handle and/or the internal components of the lockset. As such, certain locksets include a mechanism that prevents excessive torques from being transmitted from the handle to the internal components of the lockset, such as a frangible element or a slip clutch. However, existing forms of such torque-limiting mechanisms suffer from certain drawbacks or limitations. For example, frangible elements must be replaced after being broken, and existing slip clutches are typically complex and require several parts, such as rollers that can be lost if the slip clutch is opened. Moreover, traditional slip clutches, upon slipping, provide the handle with a new home orientation, and it may be difficult to return the handle to its desired home orientation. For these reasons among others, there remains a need for further improvements in this technological field.

SUMMARY

An exemplary torque-limiting spindle includes an input member, an output member, a clutch mechanism, and a bias mechanism. The input member extends along a longitudinal axis, is configured for connection with a handle, and includes a first engagement feature. The output member extends along the longitudinal axis, is configured for connection with a rotatable member of a lockset, and includes a second engagement feature. The clutch mechanism includes the first engagement feature and the second engagement feature. The bias mechanism is engaged with the input member and the output member and exerts a biasing force urging the first engagement feature and the second engagement feature into engagement with one another. Further embodiments, forms, features, and aspects of the present application shall become apparent from the description and figures provided herewith.

DETAILED DESCRIPTION OF ILLUSTRATIVE EMBODIMENTS

Figure 1:
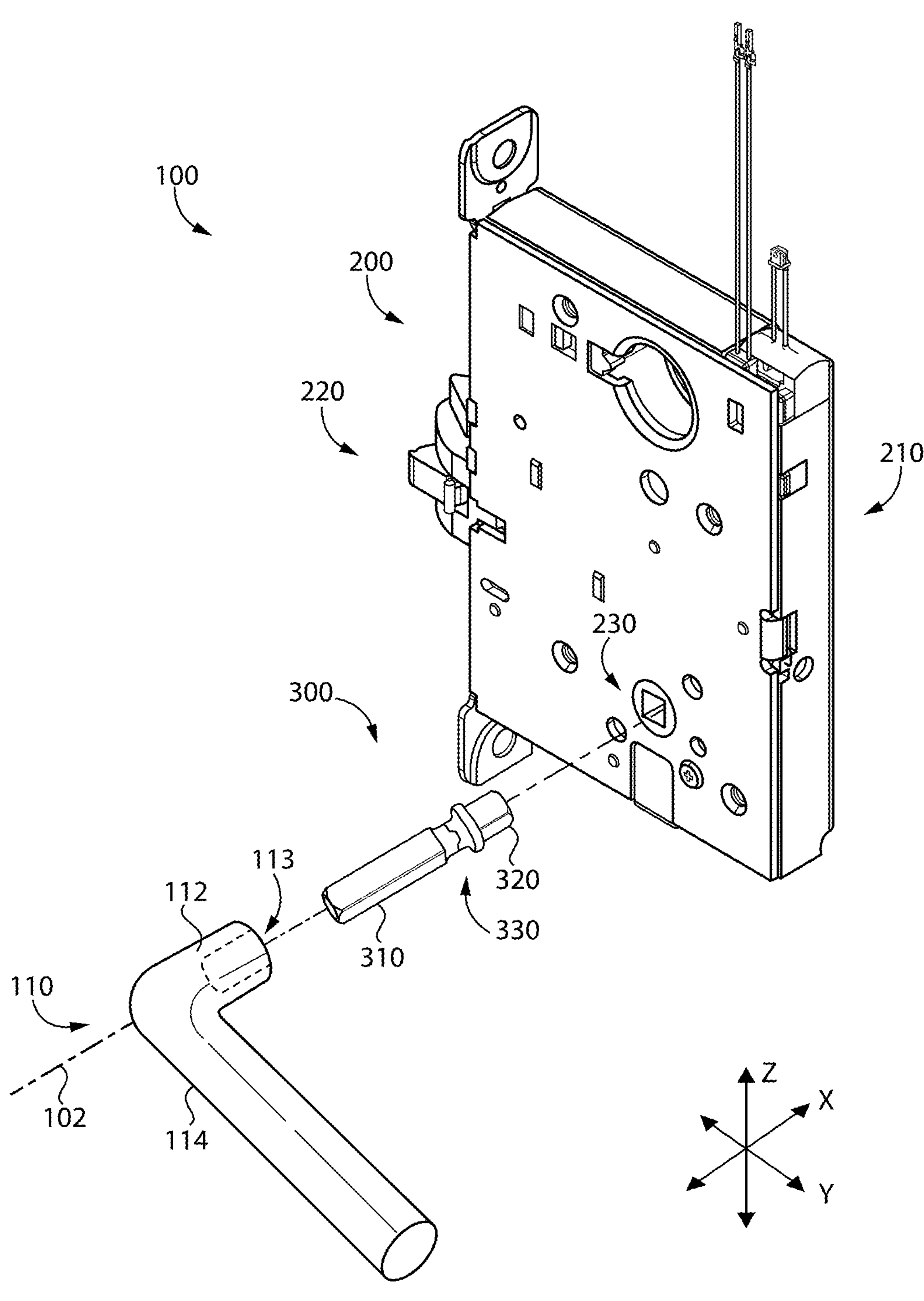
FIG. 1 is a partially-exploded assembly view of a lockset according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to “one embodiment,” “an embodiment,” “an illustrative embodiment,” etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a “preferred” component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms “longitudinal,” “lateral,” and “transverse” are used to denote motion or spacing along three mutually perpendicular axes, wherein each of the axes defines two opposite directions. In the coordinate system illustrated in FIG. 1, the X-axis defines first and second longitudinal directions, the Y-axis defines first and second lateral directions, and the Z-axis defines first and second transverse directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a lockset 100 according to certain embodiments. The lockset 100 generally includes a handle 110, a chassis assembly 200 configured for mounting in a door, and a torque-limiting spindle 300 according to certain embodiments. As described herein, the chassis assembly 200 includes a latchbolt 220 and a rotatable member in the form of a hub 230 connected with the latchbolt 220 such that rotation of the hub 230 retracts the latchbolt 220, and the spindle 300 is connected between the handle 110 and the hub 230 to selectively transmit torque from the handle 110 to the hub 230. While the illustrated lockset 100 is provided in the form of a mortise lockset, it is also contemplated that the spindle 300 described herein may be utilized in connection with other forms of locksets and/or handlesets, such as cylindrical format locksets, tubular format locksets, and escutcheon format handlesets (e.g., exit device trims).

The illustrated handle 110 generally includes a shank 112 that extends along a longitudinal axis 102 and a lever portion 114 that extends in at least one direction transverse to the longitudinal axis 102. The shank 112 includes a cavity 113 operable to receive a input member 310 of the spindle 300 for rotational coupling with the input member 310. While the illustrated handle 110 is provided as a lever handle, it is also contemplated that the handle 110 may be provided as a knob handle or another form of manual actuator, such as a thumbturn.

Figure 2:
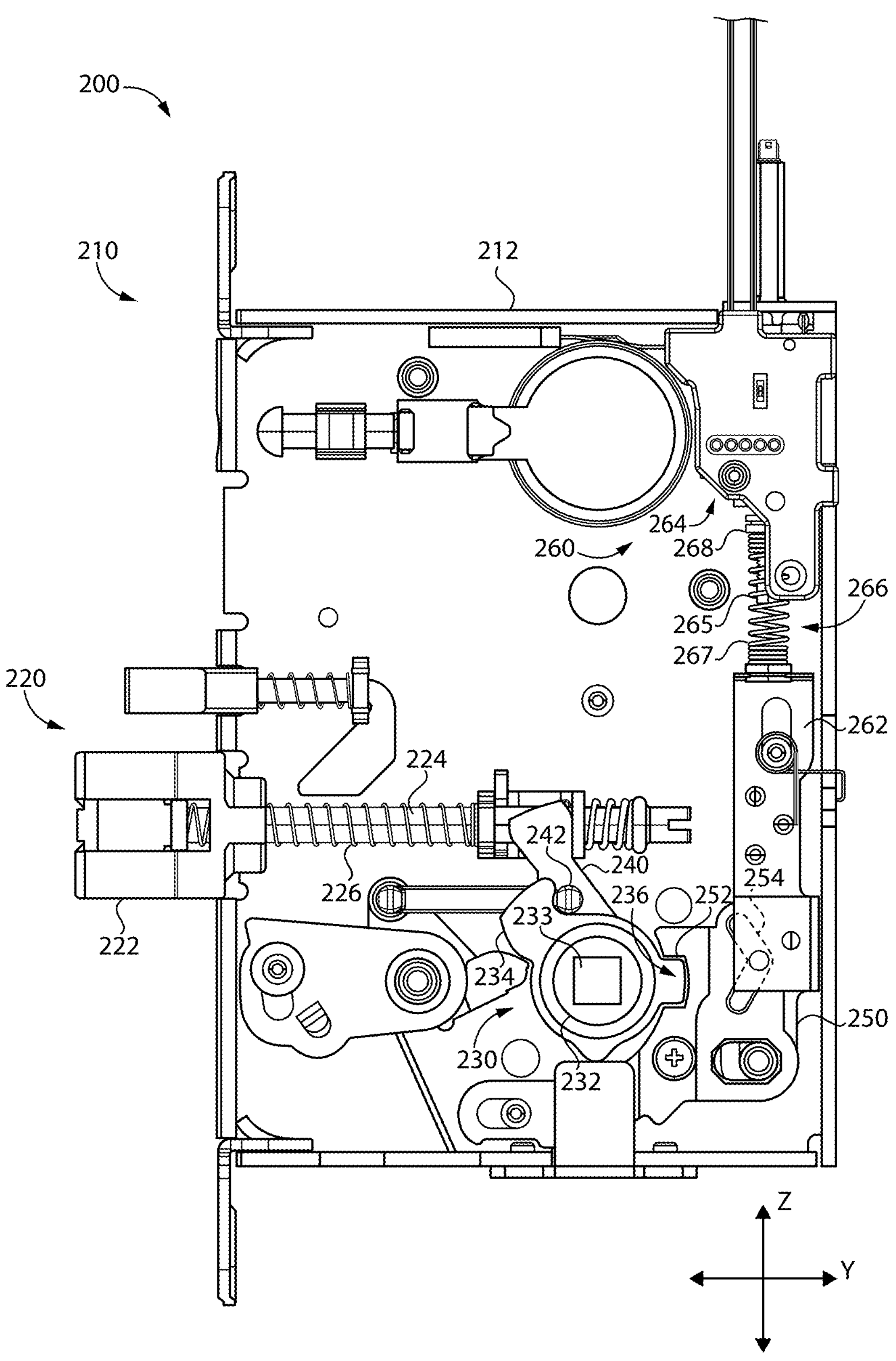
FIG. 2 is a plan view of a chassis assembly of the lockset illustrated in FIG. 1.

With additional reference to FIG. 2, the chassis assembly 200 generally includes a case 210, a latchbolt 220 movably mounted in the case 210 for movement between an extended position and a retracted position, a hub 230 rotatably mounted in the case 210, a retractor 240 configured to retract the latchbolt 220 in response to rotation of the hub 230 from a home position, a catch 250 operable to selectively prevent rotation of the hub 230 from the home position, and a drive assembly 260 operable to move the catch 250 between a locking position and an unlocking position.

The case 210 is configured for mounting in a door, and in the illustrated form is configured for mounting in a mortise of a door. The case 210 generally includes a housing 212 and a cover plate 214 removably coupled to the housing 212 to enclose the internal components of the chassis assembly 200 within the case 210.

The latchbolt 220 is mounted within the case 210 for movement between an extended position and a retracted position, and generally includes a latchbolt head 222 and a tail 224 extending rearward from the head 222. A biasing member such as a spring 226 is engaged with the latchbolt 220 and biases the latchbolt 220 toward its extended position. As described herein, the tail 224 is engaged with the retractor 240 such that the retractor 240 is operable to retract the latchbolt 220 in response to rotation of the hub 230 from its home position.

The hub 230 is rotatably mounted in the case 210 for rotation about the longitudinal axis 102, and generally includes a body portion 232 defining an opening 233 and an arm 234 projecting from the body portion 232 in a first direction, and in the illustrated form further includes a projection 236 projecting from the body portion 232 in a second direction different from the first direction. The opening 233 is operable to receive an output member 320 of the spindle 300 for rotational coupling with the output member 320. While the illustrated opening 233 has a generally square-shaped geometry, it is also contemplated that other geometries may be utilized. As described herein, the arm 234 is operable to engage the retractor 240 for retraction of the latchbolt 220, and the projection 236 is operable to engage the catch 250 to selectively lock the hub 230. It should be appreciated that a second hub may be positioned on an opposite side of the retractor 240 as the illustrated hub 230 for engagement with a second handle via a second spindle.

The retractor 240 is pivotably mounted in the case 210 and is engaged with the latchbolt tail 224. The retractor 240 includes a longitudinally-projecting post 242 operable to engage the arm 234 of the hub 230. During rotation of the hub 230 from its illustrated home position in an actuating direction (clockwise in FIG. 2), the arm 234 engages the post 242 and pivots the retractor 240 in a corresponding actuating direction, thereby causing the retractor 240 to retract the latchbolt 220. In embodiments in which the chassis 200 includes a second hub opposite the hub 230, rotation of the second hub may similarly actuate the retractor 240 for retraction of the latchbolt 220.

The catch 250 is movably mounted in the case 210 for lateral movement between a locking position and an unlocking position, and in the illustrated form includes a recess 252 operable to receive the projection 236, and a cam slot 254 operable to engage the drive assembly 260. When the catch 250 is in its locking position, the projection 236 is received in the recess 252 such that the catch 250 prevents rotation of the hub 230 from its home position. When the catch 250 is moved toward its unlocking position (to the right in FIG. 2), the recess 252 moves away from the projection 236, thereby permitting rotation of the hub 230. In the illustrated form, the hub 230 includes a projection 236, and the catch 250 includes a recess 252 operable to receive the projection 236. It is also contemplated that other configurations may be utilized in order for the catch 250 to selectively lock the hub 230 against rotation. For example, the catch 250 may include a projection, and the hub 230 may include a recess that receives the catch projection when the catch 250 is in its locking position.

The drive assembly 260 is engaged with the catch 250 and is operable to move the catch 250 between its locking position and its unlocking position. The drive assembly 260 generally includes a link 262 mounted for movement between a first transverse position and a second transverse position to laterally drive the catch 250 between its locking position and its unlocking position. More particularly, a projection such as a pin 263 extends into the cam slot 254 such that engagement between the cam slot 254 and the pin 263 causes the catch 250 to move laterally between its locking position and its unlocking position in response to transverse movement of the link 262 between its first position and its second position.

In the illustrated form, the drive assembly 260 further includes an electromechanical driver 264 and a transmission 266 engaged between the driver 264 and the link 262 such that the driver 264 is operable to move the link 262 between its first and second positions. Additionally or alternatively, the drive assembly 260 may include mechanical features for driving the link 262 between its first position and its second. While other configurations are contemplated, in the illustrated form, the driver 264 is provided as a rotary motor having a threaded output shaft 265, and the transmission 266 includes a spring 267 and a threaded coupler 268. One end of the spring 267 is engaged with the link 262, and the other end of the spring 267 is engaged with the shaft 265 via the coupler 268.

Rotation of the shaft 265 in a first rotational direction drives the coupler 268 in a first transverse direction, thereby causing the spring 267 to exert a corresponding transverse force on the link 262. This force drives the link 262 from its first position toward its second position, thereby moving the catch 250 from its locking position to its unlocking position. Conversely, rotation of the shaft 265 in a second rotational direction opposite the first rotational direction drives the coupler 268 in a second transverse direction opposite the first transverse direction, thereby causing the spring 267 to exert a corresponding transverse force on the link 262. This force drives the link 262 from its second position toward its first position, thereby moving the catch 250 from its unlocking position to its locking position.

It should be appreciated that the illustrated arrangement of the drive assembly 260 is intended as an example only, and that other configurations are contemplated. As one example, the spring 268 may be rotationally coupled with the shaft 265, and coils of the spring 268 may be engaged with the link 262 such that rotation of the spring 268 in opposite rotational directions urges the link 262 in opposite transverse directions. As another example, the motor may be replaced with a solenoid or another form of linear actuator that drives the link 262 between its first and second positions. As a further example, the electromechanical driver 264 may be omitted, and movement of the link 262 may be accomplished mechanically, for example by turning a thumbturn of the lockset 100 and/or a key associated with the lockset 100.

Figure 3:
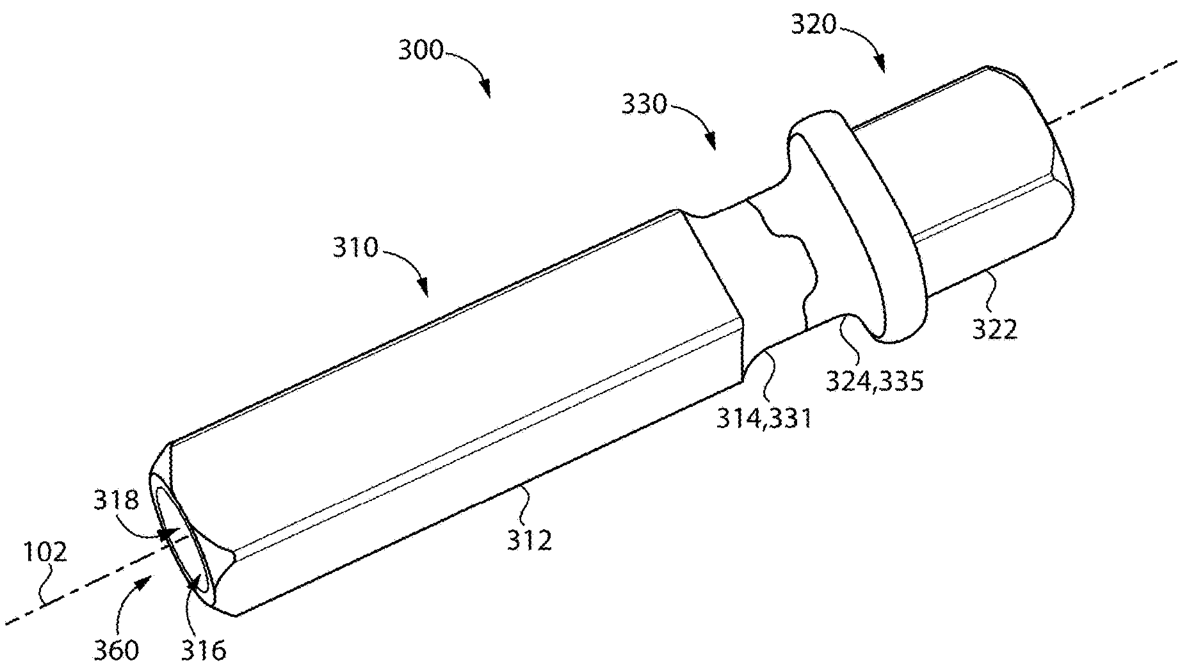
FIG. 3 is a perspective illustration of a torque-limiting spindle according to certain embodiments.
Figure 4:
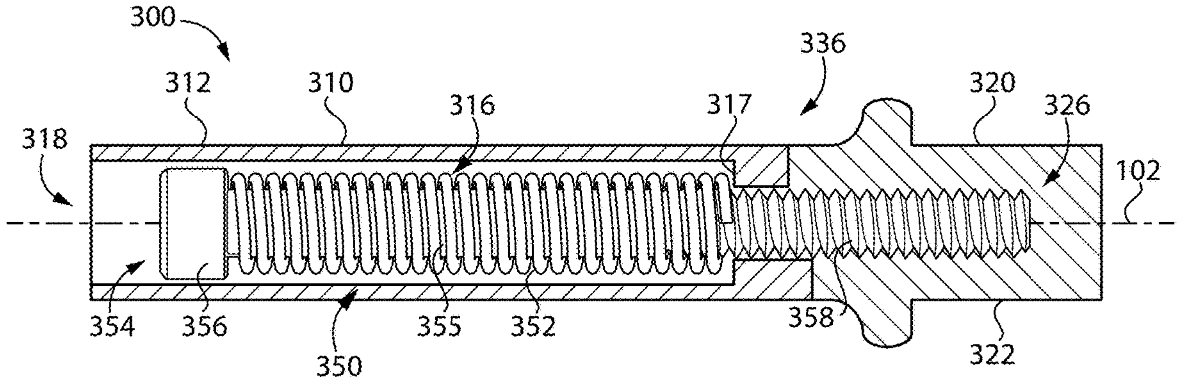
FIG. 4 is a partial cutaway view of the torque-limiting spindle illustrated in FIG. 3.

With additional reference to FIGS. 3 and 4, the torque-limiting spindle 300 generally includes a proximal input member 310, a distal output member 320, a clutch mechanism 330 defined by the input member 310 and the output member 320, and an internal bias mechanism 350 biasing the input member 310 and the output member 320 into contact with one another, and may further include one or more stop features 360. As described herein, the input member 310 is configured for connection with the handle 110, the output member 320 is configured for connection with the hub 230, the clutch mechanism 330 is configured to limit torque transmission between the input member 310 and the output member 320 to a threshold torque, the bias mechanism 350 generates a biasing force corresponding to the threshold torque, and the stop feature(s) 360 aid in retaining the bias mechanism 350 within the spindle 300.

Figure 5:
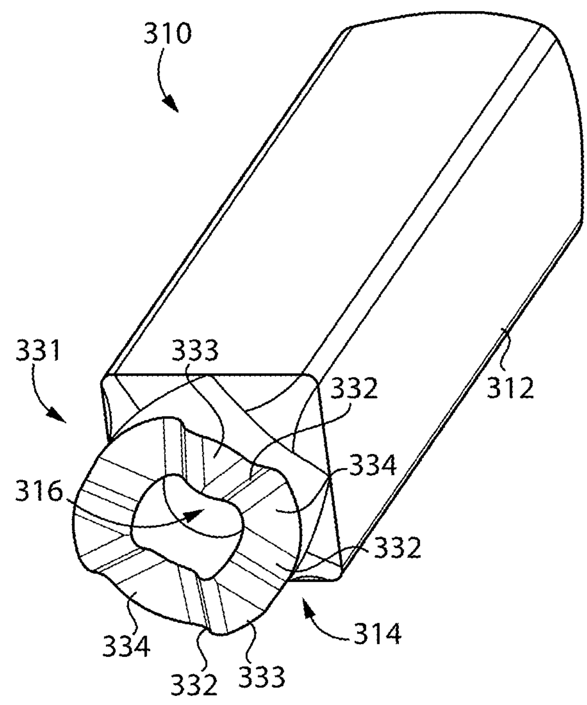
FIG. 5 is a perspective view of an input member of the torque-limiting spindle illustrated in FIG. 3.

With additional reference to FIG. 5, the input member 310 extends along the longitudinal axis 102 and includes a body portion 312 sized and shaped to be received in the cavity 113 of the shank 112, and a distal end portion 314 that defines a first engagement feature 331 of the clutch mechanism 330. A chamber 316 extends at least partially through the input member 310 and is defined in part by a distal shoulder 317. In the illustrated form, the chamber 316 extends to an open proximal end 318 of the input member 310. As described herein, the bias mechanism 350 is partially seated in the chamber 316, and engages the shoulder 317 to distally urge the input member 310 into engagement with the output member 320.

Figure 6:
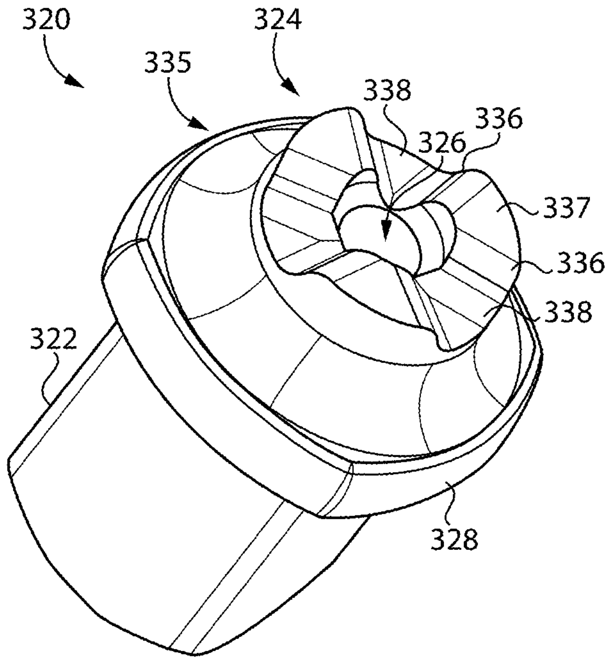
FIG. 6 is a perspective view of an output member of the torque-limiting spindle illustrated in FIG. 3.

With additional reference to FIG. 6, the output member 320 extends along the longitudinal axis 102 and includes a body portion 322 sized and shaped to be received in the opening 233 of the hub 230 and a proximal end portion 324 that defines a second engagement feature 335 of the clutch mechanism 330. In the illustrated form, a threaded bore 326 is formed in the output member 320 and receives a distal end portion of a bolt 354 of the bias mechanism 350. It is also contemplated that the bore 326 may not necessarily be threaded. The output member 320 may further include a flange 328, and a spring may be positioned between the shank 112 and the flange 328 to bias the body portion 322 into the hub opening 233, thereby accommodating for different thicknesses of the door panel to which the lockset 100 is installed.

The clutch mechanism 330 includes a first engagement feature 331 defined by the distal end portion 314 of the input member 310 and a second engagement feature 335 defined by the proximal end portion 325 of the output member 320. As described herein, the engagement features 331, 335 are biased into engagement with one another by the bias mechanism 350. Each of the illustrated engagement features 331, 335 is provided as a wave-like engagement feature including a plurality of ramps that define at least one projection and at least one recess. For example, the illustrated first engagement feature 331 includes a plurality of first ramps 332 that at least partially define a plurality of first projections 333 and a plurality of first recesses 334 positioned between the first projections 333. Similarly, the illustrated second engagement feature 335 includes a plurality of second ramps 336 that at least partially define a plurality of second projections 337 and a plurality of second recesses 338 positioned between the second projections 337. The ramps 332, 336 are shaped to generally conform to one another such that the first projections 333 are received within the second recesses 338 and the first recesses 334 receive the second projections 337.

Figure 7:
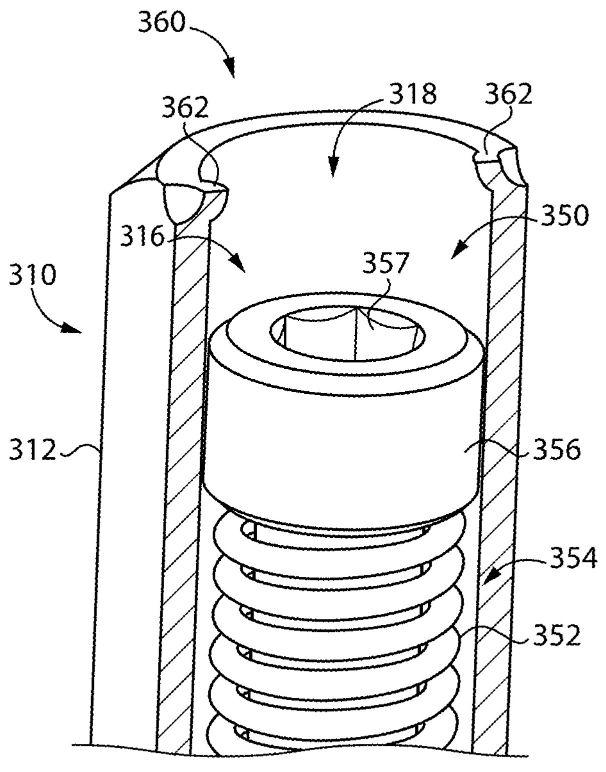
FIG. 7 is a partial cutaway view of the torque-limiting spindle illustrated in FIG. 3.

With additional reference to FIG. 7, the illustrated internal bias mechanism 350 is mounted within the input member 310 and the output member 320, and generally includes a spring 352 and a bolt 354 to which the spring 352 is mounted. The bolt 354 includes an elongated body 355, a proximal head 356, and a distal threaded portion 358. The bolt 354 is primarily positioned in the chamber 316 of the input member 310, and the distal threaded portion 358 is threaded into the threaded bore 326 of the output member 320 to provide the bolt 354 with a fixed longitudinal position relative to the output member 320. It is also contemplated that the distal portion 358 may not necessarily be threaded, and may instead be engaged with the output member 320 in another manner, such as via a fastener and/or adhesive. As described herein, however, the threaded engagement between the bolt 354 and the output member 320 may facilitate adjustment of the preloading of the spring 352 to thereby adjust the threshold torque that the spindle 300 is capable of transmitting. The bolt body 355 extends through the spring 352 such that the spring 352 is captured between the head 356 and the shoulder 317. As a result, the spring 352 distally biases the input member 310 into contact with the output member 320.

As described herein, the threshold torque that the spindle 300 is capable of transmitting between the input member 310 and the output member 320 (and thus from the handle 110 to the hub 230) corresponds to the biasing force exerted by the bias mechanism 350. In certain embodiments, the spring 352 may be preloaded to increase the biasing force exerted by the bias mechanism 350. Additionally or alternatively, the bolt head 356 may include a feature by which the head 356 can be engaged by a tool operable to tighten or loosen the bolt 354 to increase or decrease the preload of the spring 352. For example, the illustrated head 356 includes a tool-engaging feature 357 in the form of a recess sized and shaped to receive a tip of a hex key by which the bolt 354 can be rotated. It is also contemplated that the tool-engaging feature 357 may take another form, such as that of a Phillips head recess, a flathead recess, a star-drive recess, or a recess or projection of another geometry by which torque can be transmitted from an appropriate tool to the bolt 354. In the illustrated form, such a tool may be inserted through the open proximal end 318 to facilitate adjustment of the preload provided by the spring 352.

Figure 8:
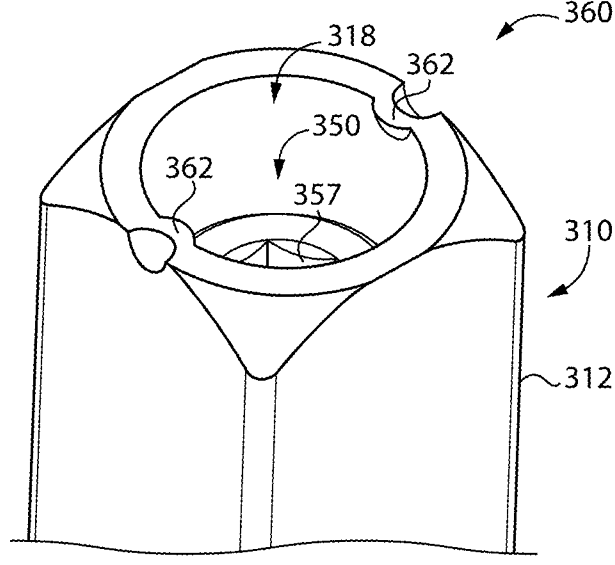
FIG. 8 is a proximal end view of the torque-limiting spindle illustrated in FIG. 3.

With additional reference to FIG. 8, the stop feature(s) 360 are configured to prevent exiting of the bias mechanism 350 from the cavity 316 via the open proximal end 318 of the input member 310. In the illustrated form, the stop feature(s) 360 are provided in the form of a pair of radial projections 362 that project inwardly to reduce the effective diameter of the open proximal end 318. More particularly, the illustrated stop feature(s) 360 reduce the effective diameter of the open proximal end 318 to an effective diameter that is less than the diameter of the bolt head 356. As a result, the bias mechanism 350 remains captured within the chamber 316, even when the threaded distal portion 358 is fully disengaged from the threaded bore 326.

Should the spring 352 be preloaded as described above, it may be the case that loosening the bolt 354 until the distal end 358 exits the threaded bore 326 causes the spring 352 to continue urging the bolt 354 in the proximal direction. Should the preload be sufficiently high, the spring 352 may exert a sufficient force to cause the bolt 354 to shoot in the proximal direction toward the user when the threads of the distal end 358 disengage from the threads of the bore 326. However, the exiting of the bolt 354 from the cavity 316 by the stop feature(s) 360 is prevented as described above, thereby protecting the user from harm.

During manufacture and/or assembly of the spindle 300, the stop feature(s) 360 may initially be omitted from the input member 310 to facilitate insertion of the bias mechanism 350 into the chamber 316. The bias mechanism 350 may be inserted into the chamber 316 such that the threaded distal end portion 358 projects beyond the distal end of the input member 310. The threaded distal end portion 358 may then be inserted into the threaded bore 326, and an appropriate tool may be inserted via the open proximal end 318 to rotate the bolt 354 until a desired preloading of the spring 352 is achieved. The stop feature(s) 360 may then be formed in the input member 310, for example by deforming the proximal end of the input member 310 to define the radial projections 362. It is also contemplated that the stop member(s) 360 may be provided to the input member 310 in another manner, for example by inserting a set screw through an opening formed in the proximal end portion of the input member 310.

Once assembled, the spindle 300 may be installed to the lockset 100 in a manner similar to that of conventional spindles. For example, the distal end portion of the spindle 300, which is defined by the body portion 322 of the output member 320, may be inserted into the hub opening 233 for engagement with the hub 230 in a manner common to mortise locksets. Similarly, the proximal end portion of the spindle 300, which is defined by the body portion 312 of the input member 310, may be inserted into the handle cavity 113 for engagement with the handle 110. The input member 310 may, for example, include a radial bore operable to receive a set screw by which the handle 110 may be longitudinally and rotationally coupled with the input member 310.

Once installed to the lockset 100, the spindle 300 serves to selectively transmit torque from the handle 110 to the hub 230 by transmitting torques below a threshold torque while slipping in response to application of torque in excess of the threshold torque. The threshold torque is sufficiently high that when the lockset 100 is in its unlocked state, the spindle 300 is capable of transmitting a torque sufficient to rotate the hub 230 to drive the latchbolt 220 to its retracted position. More particularly, the bias mechanism 350 retains the engagement features 331, 335 in engagement with one another such that torques applied to the handle 110 are transmitted to the hub 230 for retraction of the latchbolt 220.

When the lockset 100 is in its locked state and a torque below the threshold torque value is applied to the handle 110, the bias mechanism 350 retains the engagement features 331, 335 in engagement with one another such that the ramps 332, 336 resist relative rotation of the input member 310 and the output member 320. As the applied torque increases, the engagement features 331, 335 begin to slip, and the ramps 332, 336 drive the input member 310 axially away from the output member 320, thereby permitting rotation of the input member 310 relative to the output member 320 and preventing the excessive torque from being transmitted to the hub 230. Should the excessive torque continue to be applied, each protrusion 333 will enter the recess 336 that was previously adjacent to the protrusion, thereby providing the handle 110 with a new orientation relative to the chassis 200.

Those skilled in the art will readily recognize that the number of discrete rotational positions available to the handle 110 corresponds to the number of protrusions 333, 337 and recesses 334, 338. In the illustrated form, the spindle 300 includes three of the protrusions 333, 337 and three of the recesses 334, 338 to thereby provide the handle 110 with three discretely selectable orientations. Should a first excessive torque be applied to rotate the handle 110 to a non-desired orientation, a second excessive torque may be applied to return the handle 110 to the desired orientation in discrete increments. These discrete orientations are in contrast to certain conventional slip clutches, which provide the handle with a continuous range of positions when excessive torque is applied. As a result of the continuous range of positions, it may be difficult to return the handle to the precise desired orientation after the application of an excessive torque. As such, the discrete rotational positions provided by the illustrated spindle may be advantageous in comparison to traditional slip clutches.

In certain circumstances, it may be desirable to adjust the threshold torque to which the clutch mechanism 330 is configured to limit torque transmission between the input member 310 and the output member 320. As will be appreciated, this threshold torque value depends upon a number of factors, including but not limited to the angles of the ramps 332, 336, the frictional coefficient of the ramps 332, 336, and the biasing force exerted by the bias mechanism 350. Of these factors, the most practical to adjust after manufacture of the spindle 300 is the biasing force exerted by the bias mechanism 350. Adjusting this biasing force may, for example, be accomplished by tightening or loosening the bolt 354 to increase or decrease the preload of the spring 352.

In order to adjust the biasing force generated by the bias mechanism 350 (and thus the threshold torque operable to be transmitted by the clutch mechanism 330), the handle 110 may be removed from the spindle 300 and an appropriate tool may be inserted via the open proximal end 318 for engagement with the tool-engaging feature 357. The tool may then be rotated in an appropriate direction for adjustment of the biasing force. For example, tightening the bolt 354 may increase the preload of the spring 352 to cause a corresponding increase the biasing force (and thus the threshold torque), while loosening the bolt 354 may decrease the preload of the spring 352 to cause a corresponding decrease in the biasing force (and thus the threshold torque).

Figure 9:
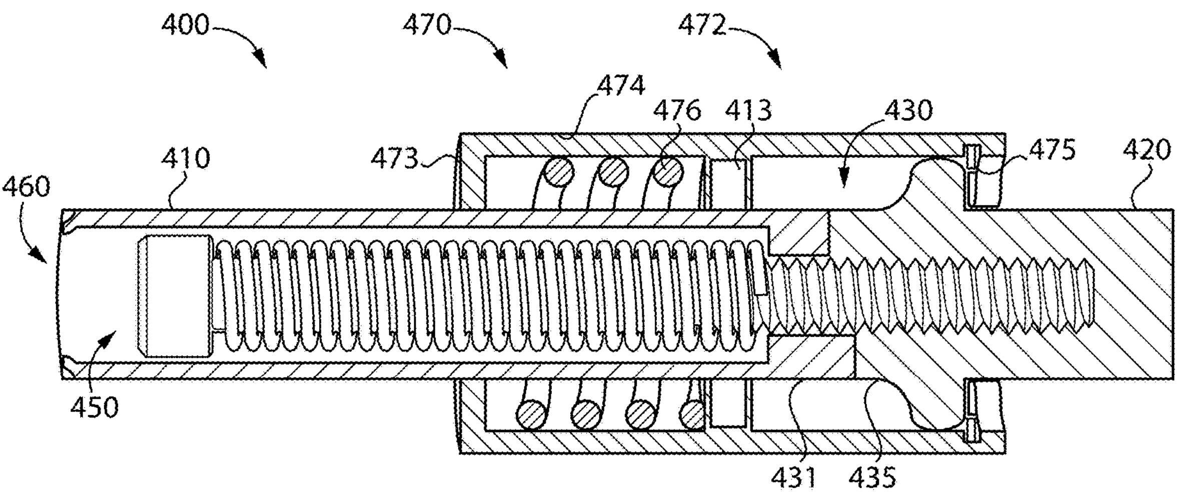
FIG. 9 is a partial cutaway view of a torque-limiting spindle according to certain embodiments.
Figure 10:
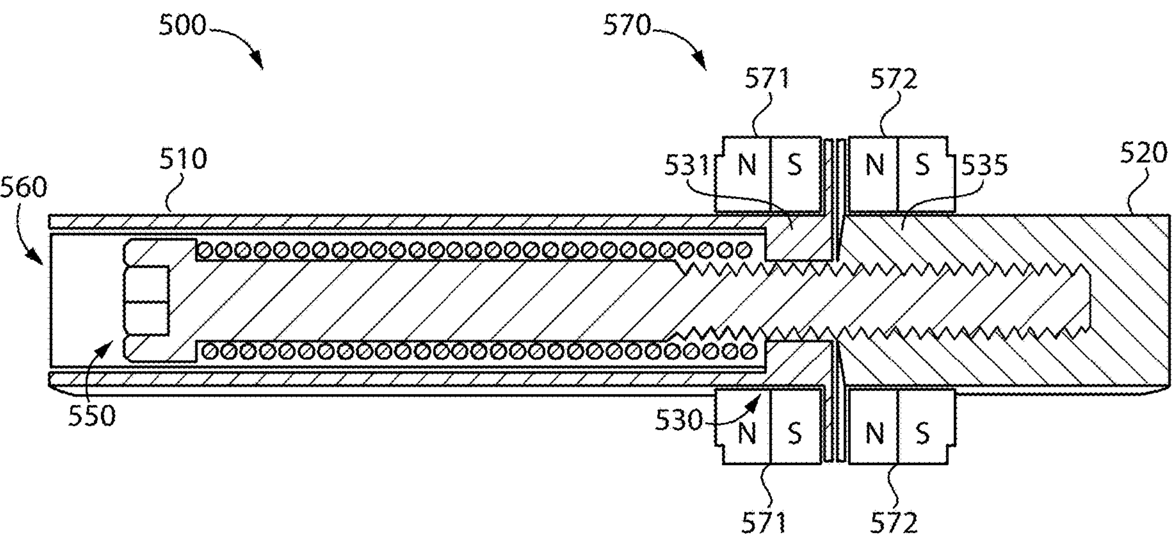
FIG. 10 is a cross-sectional illustration of a torque-limiting spindle according to certain embodiments.

With additional reference to FIG. 9, illustrated therein is a torque-limiting spindle 400 according to certain embodiments. The spindle 400 is substantially similar to the above-described spindle 300, and similar elements and features are indicated with similar reference characters. For example, the spindle 400 includes an input member 410, an output member 420, a clutch mechanism 430, a bias mechanism 450, and one or more stop features 460, which respectively correspond to the above-described input member 310, output member 320, clutch mechanism 330, bias mechanism 350, and stop feature(s) 360. In the interest of conciseness, the following description of the spindle 400 focuses primarily on elements and features that are different from those described above with reference to the spindle 300.

In the illustrated form, the spindle 400 includes an external bias mechanism 470 that supplements or replaces the biasing force of the internal bias mechanism 450. The external bias mechanism 470 generally includes a collar 472 and a compression spring 476 mounted in the collar 472. The collar 472 includes a proximal end wall 473 having an opening through which the input member 410 extends, and a circumferential sidewall 474 extending distally from the end wall 473. A circlip 475 is positioned at a distal end of the collar 472 and abuts the flange 428 of the output member 420. A portion of the input member 410 extends through the spring 476, and the spring 476 is sandwiched between the end wall 473 and a flange 413 formed on the input member 410, thereby providing an additional biasing force urging the engagement features 431, 435 of the clutch mechanism 430 into engagement with one another.

In the illustrated form, the biasing force provided by the external bias mechanism 470 supplements the biasing force provided by the internal bias mechanism 450, thereby increasing the threshold torque associated with the spindle 400. While the illustrated spindle 400 includes both the internal bias mechanism 450 and the external bias mechanism 470, it is also contemplated that the external bias mechanism 470 may be used instead of the internal bias mechanism 450 such that the internal bias mechanism 450 may be omitted. In such forms, the biasing force urging the engagement features 431, 435 of the clutch mechanism 430 into engagement with one another may be defined by the external bias mechanism 470

With additional reference to FIG. 9, illustrated therein is a torque-limiting spindle 500 according to certain embodiments. The spindle 500 is substantially similar to the above-described spindle 300, and similar elements and features are indicated with similar reference characters. For example, the spindle 500 includes an input member 510, an output member 520, a clutch mechanism 530, a bias mechanism 550, and one or more stop features 560, which respectively correspond to the above-described input member 310, output member 320, clutch mechanism 330, bias mechanism 350, and stop feature(s) 360. In the interest of conciseness, the following description of the spindle 500 focuses primarily on elements and features that are different from those described above with reference to the spindle 300.

In the illustrated form, the spindle 500 includes an external bias mechanism 570 that supplements or replaces the biasing force of the internal bias mechanism 550. The external bias mechanism 570 generally includes at least one first magnet 571 mounted to the input member 510 and at least one second magnet 572 mounted to the output member 520. The magnets 571, 572 are oriented to provide an attractive magnetic force urging the input member 510 and the output member 520 into engagement with one another, thereby urging the engagement features 531, 535 of the clutch mechanism 530 into engagement with one another.

In the illustrated form, the biasing force provided by the external bias mechanism 570 supplements the biasing force provided by the internal bias mechanism 550, thereby increasing the threshold torque associated with the spindle 500. While the illustrated spindle 500 includes both the internal bias mechanism 550 and the external bias mechanism 570, it is also contemplated that the external bias mechanism 570 may be used instead of the internal bias mechanism 550 such that the internal bias mechanism 550 may be omitted. In such forms, the biasing force urging the engagement features 531, 535 of the clutch mechanism 530 into engagement with one another may be defined by the external bias mechanism 570.

One differentiating feature associated with the magnetic external bias mechanism 570 relates to the feel of the spindle 500 during use. As will be appreciated by those skilled in the art, the bias force provided by magnets varies non-linearly with respect to distance, and decreases as distance increases. Thus, the bias force provided by the magnetic external bias mechanism 570 will decrease as the engagement features 531, 535 drive the magnets 571, 572 away from each other. This feature provides for a more sudden breakaway when excessive torque is applied when compared to the gradual slippage that occurs in association with the linear elastic deformation of springs.

Figure 11:
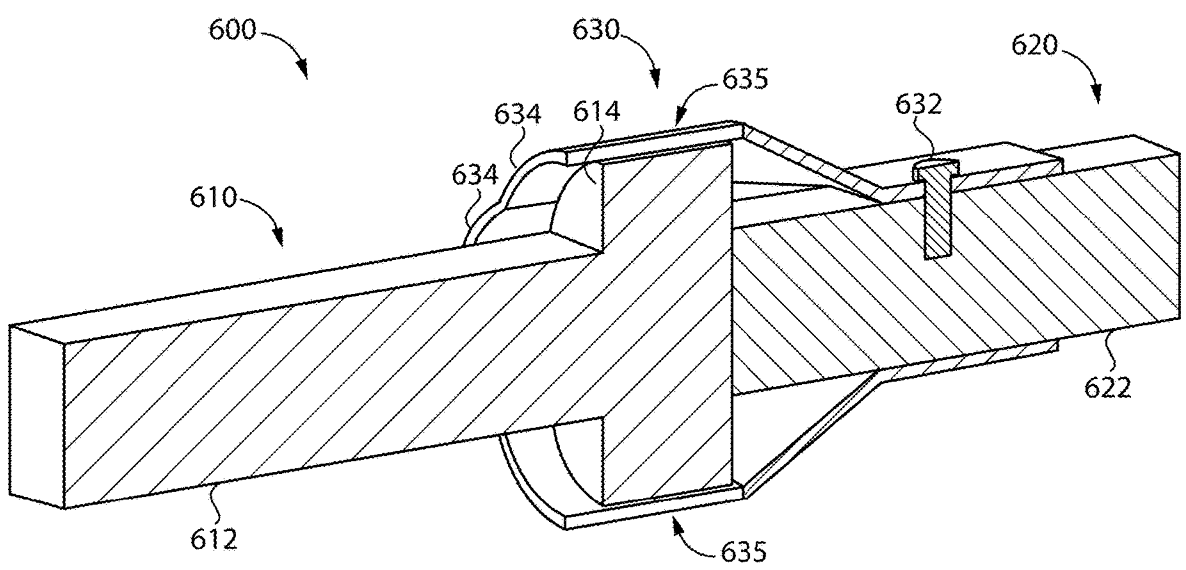
FIG. 11 is a cross-sectional illustration of a torque-limiting spindle according to certain embodiments.
Figure 12:
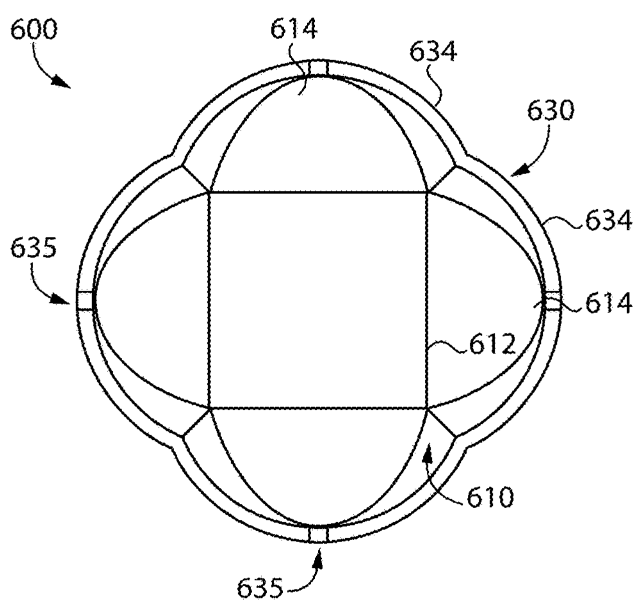
FIG. 12 is an end view of the torque-limiting spindle illustrated in FIG. 11.

With additional reference to FIGS. 11 and 12, illustrated therein is a torque-limiting spindle 600 according to certain embodiments. The spindle 600 generally includes a first spindle portion 610 defining one of an input member or an output member, a second spindle portion 620 defining the other of an input member or an output member, and a deformable collar 630 that selectively rotationally couples the first spindle portion 610 with the second spindle portion 620.

The first spindle portion 610 defines one of an input member or an output member, and generally includes a body portion 612 and at least one radial lobe 614 extending radially from the body portion 612. In the illustrated embodiment, the at least one radial lobe 614 comprises a plurality of the radial lobes 614. While other geometries are contemplated, in the illustrated form, the radial lobes 614 have a generally parabolic shape. In certain embodiments, the first spindle portion 610 may be configured as an input member configured for connection with the handle 110. In such forms, the body portion 612 may be sized and shaped for reception in the chamber 113. In other embodiments, the first spindle portion 610 may be configured as an output member configured for connection with the hub 230. In such forms, the body portion 612 may be sized and shaped for reception in the hub opening 233.

The second spindle portion 620 defines the other of an input member or an output member, and generally includes a body portion 622. In certain embodiments, the second spindle portion 620 may be configured as an input member configured for connection with the handle 110. In such forms, the body portion 622 may be sized and shaped for reception in the chamber 113. In other embodiments, the second spindle portion 620 may be configured as an output member configured for connection with the hub 230. In such forms, the body portion 622 may be sized and shaped for reception in the hub opening 233.

The collar 630 is coupled with the second spindle portion 620, for example via a pin 632, and includes a plurality of recessed portions 634 that receive the radial lobes 614 of the first spindle portion 610. While other geometries are contemplated, in the illustrated form, the recessed portions 634 have generally semi-circular shapes. The collar 630 is formed of an elastically deformable material that resists rotation of the first spindle portion 610 without preventing such rotation. In certain embodiments, one or more of the recessed portions 634 may comprise a slit 635 that facilitates the elastic deformation of the collar 630 during relative rotation of the first spindle portion 610 and the second spindle portion 620.

During operation of the spindle 600, the collar 630 initially receives the lobes 614 of the first spindle portion 610. When a torque below the threshold torque is applied between the first spindle portion 610 and the second spindle portion 620, the collar 630 retains its shape and transmits such torque between the first spindle portion 610 and the second spindle portion 620. When the applied torque exceeds the threshold torque, the lobes 614 elastically deform the collar 630 to permit relative rotation of the first spindle portion 610 and the second spindle portion 620. When the first spindle portion 610 is rotated through a predetermined angle relative to the second spindle portion 620, the collar 630 returns to its original shape as each lobe 614 enters a new recess 634 to provide the handle 110 with a new orientation relative to the chassis 200. This new orientation is provided in one of a plurality of discrete orientations, with the number of available discrete orientations corresponding to the number of lobes 614 and/or recesses 634. The handle 110 may be returned to its desired orientation by applying excessive torque to once again cause elastic deformation of the collar 630 to return each lobe 614 to its original recess 634.

In the illustrated embodiment, the distal end of the first spindle portion 610 and the proximal end of the second spindle portion 620 are substantially flat, and thus do not define an axial clutch mechanism along the lines of the clutch mechanism 330. It is also contemplated that the spindle 600 may be provided with ramps that define an axial clutch mechanism along the lines of the above-described clutch mechanism 330. In such forms, the spindle 600 may further include a bias mechanism along the lines of the bias mechanism 350 such that the rotational clutch mechanism defined by the deformable collar 630 and the axial clutch mechanism both contribute to the threshold torque.

In certain embodiments, a torque-limiting spindle such as one of the above-described spindles 300, 400, 500, 600 may be provided to the lockset 100 at the time of manufacture and/or sale to an end user. It is also contemplated that a torque-limiting spindle may be provided in a retrofit kit for an existing lockset. For example, the lockset 100 may initially be provided with a conventional spindle such that locking of the hub 220 prevents rotation of the handle attached to the conventional spindle. A method of retrofitting such a lockset may comprise providing a torque-limiting spindle (e.g., one of the above-described spindles 300, 400, 500, 600), wherein the torque-limiting spindle is configured to replace the existing spindle of the lockset. The method may further comprise replacing the conventional spindle with the torque-limiting spindle, thereby converting the existing lockset to a retrofitted lockset along the lines of the above-described lockset 100. Whereas the original lockset (including the conventional spindle) was configured to rotationally lock the handle when the lockset was in the locked state, the retrofitted lockset (including the torque-limiting spindle) is operable to provide a breakaway function whereby the handle is capable of rotating when the lockset is in the locked state.

As noted above, although the illustrated lockset 100 is provided in the form of a mortise lockset, it is also contemplated that a torque-limiting spindle along the lines of the illustrated spindles 300, 400, 500, 600 may be utilized in connection with other forms of locksets. For example, in embodiments in which the spindle is configured for use with a cylindrical lockset, the output member may be configured for connection with a rotatable member in the form of a portion of a key cam assembly, such as the shell thereof. In embodiments in which the spindle is configured for use with a tubular lockset, the output member thereof may be configured for connection with a rotatable member in the form of a retractor of a tubular latch mechanism. It is also contemplated that other embodiments of the torque-limiting spindle described herein may include additional or alternative features appropriate for use with the components typical of other lockset formats.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A torque-limiting spindle, comprising:

an input member extending along a longitudinal axis and configured for connection with a handle, the input member comprising an input member end face that varies longitudinally to thereby define a first engagement feature;

an output member extending along the longitudinal axis and configured for connection with a rotatable member of a lockset, the output member comprising an output member end face that varies longitudinally to thereby define a second engagement feature;

a bias mechanism engaged between the input member and the output member and exerting a biasing force to bias the input member toward the output member and urge the first engagement feature and the second engagement feature into engagement with one another; and a clutch mechanism comprising the first engagement feature and the second engagement feature;

wherein the clutch mechanism is configured to transmit an input torque from the input member to the output member when the input torque is below a threshold torque; and wherein the clutch mechanism is configured to slip by causing relative longitudinal movement of the input member and the output member when the input torque is above the threshold torque.

2. The torque-limiting spindle of claim 1, wherein the first engagement feature comprises a first longitudinal ramp;

wherein the second engagement feature comprises a second longitudinal ramp; and wherein the first longitudinal ramp and the second longitudinal ramp are configured to urge one another longitudinally away from one another in response to the input torque.

3. The torque-limiting spindle of claim 2, wherein the first longitudinal ramp at least partially defines a first projection and a first recess;

wherein the second longitudinal ramp at least partially defines a second projection and a second recess;

wherein the first recess is operable to receive the second projection; and wherein the second recess is operable to receive the first projection.

4. The torque-limiting spindle of claim 1, wherein the first engagement feature comprises a plurality of first projections and a plurality of first recesses;

wherein the second engagement feature comprises a plurality of second projections and a plurality of second recesses;

wherein the first recesses are operable to receive the second projections; and wherein the second recesses are operable to receive the first projections.

5. The torque-limiting spindle of claim 1, wherein the bias mechanism comprises an external bias mechanism positioned externally of the input member and the output member and providing the biasing force urging the first engagement feature and the second engagement feature into engagement with one another.

6. A lockset comprising the torque-limiting spindle of claim 1, the lockset further comprising:

a bolt member engaged with the output member such that the bolt member is operable to move between an extended position and a retracted position in response to rotation of the output member; and a handle rotationally coupled with the input member.

7. The torque-limiting spindle of claim 1, wherein the bias mechanism comprises:

an elongate member extending from the output member; and a spring engaged between a first portion of the elongate member and a second portion of the input member.

8. A torque-limiting spindle, comprising:

a first spindle member extending along a longitudinal axis, the first spindle member comprising a first end face that varies longitudinally to thereby define a first engagement feature;

a second spindle member extending along the longitudinal axis, the second spindle member comprising a second end face that varies longitudinally to thereby define a second engagement feature;

a bias mechanism engaged between the first spindle member and the second spindle member and exerting a biasing force to bias the first spindle member toward the second spindle member and urge the first engagement feature and the second engagement feature into engagement with one another; and a clutch mechanism comprising the first engagement feature and the second engagement feature;

wherein the clutch mechanism is configured to transmit an input torque from the input member to the output member when the input torque is below a threshold torque; and wherein the clutch mechanism is configured to slip by causing relative longitudinal movement of the input member and the output member when the input torque is above the threshold torque.

9. The torque-limiting spindle of claim 8, wherein the first spindle member comprises a chamber and a shoulder partially defining the chamber; and wherein the bias mechanism comprises:

an elongate member comprising a head and an end portion opposite the head, wherein the end portion is engaged with the second spindle member; and a spring disposed within the chamber and captured between the head and the shoulder.

10. The torque-limiting spindle of claim 9, wherein the end portion is threadedly engaged with the second spindle member such that rotation of the elongate member relative to the second spindle member adjusts the biasing force exerted by the spring.

11. The torque-limiting spindle of claim 10, wherein the head is disposed within the chamber; and wherein the chamber has an open end through which the head is accessible to thereby facilitate rotation of the elongate member.

12. The torque-limiting spindle of claim 11, wherein the first spindle member further comprises one or more radial projections that project into the open end to thereby prevent removal of the elongate member from the chamber.

13. A lockset comprising the torque-limiting spindle of claim 8, the lockset further comprising:

a bolt member engaged with one of the first spindle member or the second spindle member such that the bolt member moves between an extended position and a retracted position in response to rotation of the one of the first spindle member or the second spindle member; and a handle rotationally coupled with the other of the first spindle member or the second spindle member.

14. The torque-limiting spindle of claim 8, wherein the bias mechanism comprises:

an elongate member extending from the first spindle member; and a spring engaged between a first portion of the elongate member and a second portion of the second spindle member.

15. A torque-limiting spindle, comprising:

a first spindle member extending along a longitudinal axis, the first spindle member comprising a first longitudinal ramp;

a second spindle member extending along the longitudinal axis, the second spindle member comprising a second longitudinal ramp; and a bias mechanism engaged between the first spindle member and the second spindle member and exerting a biasing force to bias the first spindle member toward the second spindle member and urge the first spindle member and the second spindle member into engagement with one another; and wherein the first longitudinal ramp and the second longitudinal ramp are configured to engage one another in response to an input torque, to transmit the input torque between the first spindle member and the second spindle member when the input torque is less than a threshold torque, and to cause relative longitudinal movement of the first spindle member and the second spindle member when the input torque is greater than the threshold torque.

16. The torque-limiting spindle of claim 15, wherein the first spindle member comprises a first end face comprising the first longitudinal ramp; and wherein the second spindle member comprises a second end face comprising the second longitudinal ramp.

17. The torque-limiting spindle of claim 16, wherein the first end face further comprises:

a first projection; and a first recess that is longitudinally offset from the first projection and connected to the first projection by the first longitudinal ramp; and wherein the second end face further comprises:

a second projection; and a second recess that is longitudinally offset from the second projection and connected to the second projection by the second longitudinal ramp.

18. The torque-limiting spindle of claim 15, wherein the bias mechanism comprises a spring and an elongate member, the elongate member extending from the second spindle member into a chamber of the first spindle member; and wherein the spring is disposed within the chamber and captured between a head of the elongate member and a shoulder of the first spindle member.

19. The torque-limiting spindle of claim 15, wherein the first spindle member comprises a chamber and a shoulder partially defining the chamber;

wherein the bias mechanism comprises a spring and an elongate member;

wherein the elongate member comprises:

a bolt having a threaded portion engaged with the second spindle member; and a head; and wherein the spring is disposed within the chamber and captured between the head and the shoulder.

20. The torque-limiting spindle of claim 19, wherein rotation of the bolt relative to the second spindle member adjusts the biasing force exerted by the spring;

wherein the head is disposed within the chamber; and wherein the chamber has an open end through which the head is accessible to thereby facilitate rotation of the bolt.

21. The torque-limiting spindle of claim 20, wherein the first spindle member further comprises one or more radial projections that project into the open end to thereby prevent removal of the bolt from the chamber.

22. A lockset comprising the torque-limiting spindle of claim 15, the lockset further comprising:

a bolt member engaged with one of the first spindle member or the second spindle member such that the bolt member moves between an extended position and a retracted position in response to rotation of the one of the first spindle member or the second spindle member; and a handle rotationally coupled with the other of the first spindle member or the second spindle member.

23. The torque-limiting spindle of claim 15, wherein the bias mechanism comprises:

an elongate member extending from the first spindle member; and a spring engaged between a first portion of the elongate member and a second portion of the second spindle member.

* * * * *